Dec. 24, 1968     M. J. WILLARD     3,418,142
DEHYDRATION OF MASHED POTATOES WITH A COOLED
SPREADER ROLL AND APPARATUS THEREFOR
Filed Oct. 12, 1964

INVENTOR.
MILES J. WILLARD
BY
Christie, Parker & Hale
ATTORNEYS.

| United States Patent Office | 3,418,142
Patented Dec. 24, 1968 |

3,418,142
DEHYDRATION OF MASHED POTATOES WITH A
COOLED SPREADER ROLL AND APPARATUS
THEREFOR
Miles J. Willard, 3067 Gustafson Circle,
Idaho Falls, Idaho 83401
Filed Oct. 12, 1964, Ser. No. 403,050
15 Claims. (Cl. 99—207)

ABSTRACT OF THE DISCLOSURE

A mashed potato dehydration method which includes the steps of spreading a thin layer of the mashed potatoes on a moving drying surface with the help of at least one spreader roll, heating the layer on the drying surface and cooling the spreader roll to lower the temperature of the mashed potatoes disposed thereon. The apparatus includes a movable drying surface adjacent to and spaced apart from the spreader roll which is rotatable about an axis transverse to the direction of movement of the drying surface. A surface of the spreader roll is cooled to maintain the potatoes disposed on it at the temperature which is less than the temperature of the potatoes disposed on the drying surface.

---

Figure 1:
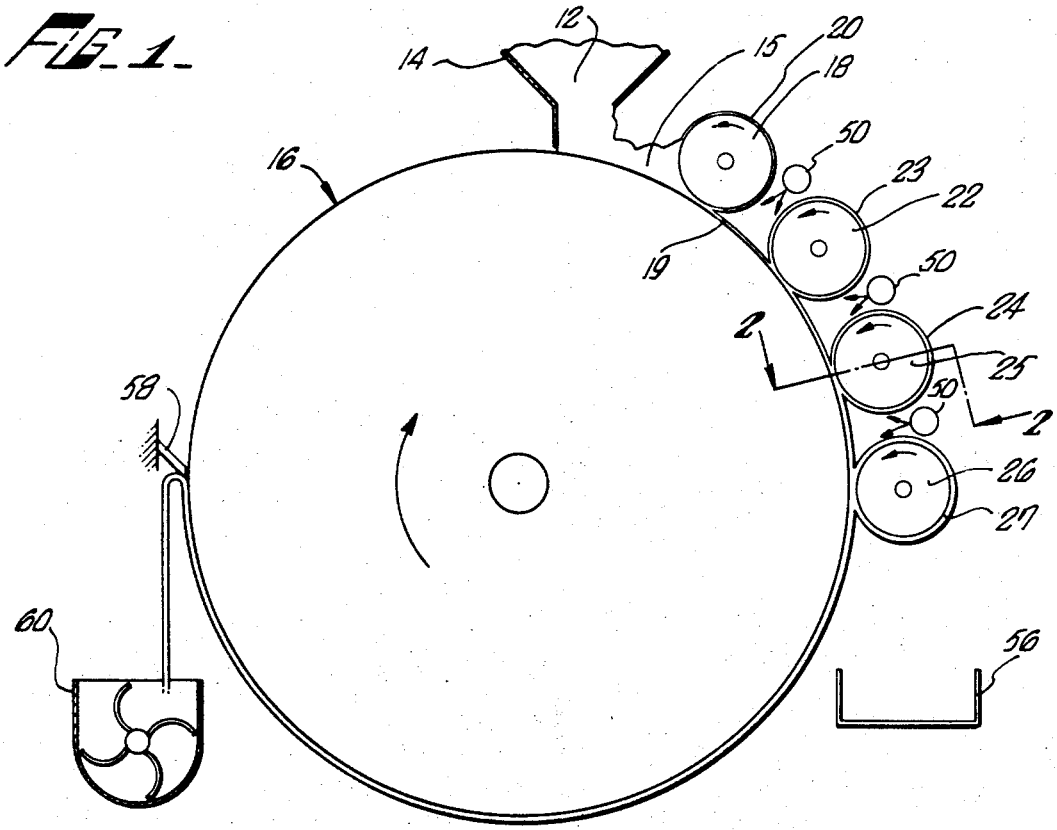

This invention relates to a process and apparatus for dehydrating cooked, mashed potatoes and other vegetables and fruits into flakes.

In the past ten years, a process has been developed for dehydrating mashed potatoes into flakes which may be stored for an indefinite period and thereafter reconstituted by the addition of moisture. The reconstituted potato has a flavor and texture which is quite similar to that of the freshly cooked vegetable. The preparation of the mash for drying, well known in the art, includes the steps of trimming sound potatoes, slicing, precooking, cooling, steam cooking, and mashing, care being taken in all steps not to rupture potato cells which would cause a pasty product. The potato mash is applied to a rotating heated drier drum by a series of rotating spreader rolls adjacent to the drum. As the mashed potatoes pass between the rotating drier drum and the spreader rolls, a relatively thick layer of mashed potatoes accumulates on the spreader rolls, and a thinner, approximately unicellular, layer is applied to the drier drum.

The spreader rolls perform two functions. The first is to deposit succeeding layers of mashed potatoes onto the hot drum, thus building up the thickness of the dried flakes to an economical size. Thinner flakes have a light bulk density, and are expensive to package. The second function of the spreader rolls is the progressive removal of defects from the mashed potatoes. During the time the mashed potatoes stay on the spreader rolls, defective materials, such as particles of skin, rot, corky tissue, etc., are progressively concentrated and transferred with the mash from the first roll to the last roll. The material on the last roll is periodically removed by an operator with a scraper, and is discarded. Thus, the rolls serve as a separation device for removing undesirable portions of the potato from the mash prior to drying. An alternative method is removal of the defects by hand trimming, but the expense is prohibitive.

One problem encountered in making potato flakes as described above from potatoes with relatively high solid content is that the mash on the spreader rolls tends to drop from one roll to the next. Because of this, it is necessary to use an operator with each drier to shovel the mash back toward the first roll. This is particularly troublesome when drying mashed potatoes containing emulsifiers to improve texture, as well as with potatoes having a solid content over about 20% solids by weight. When drying potatoes having a solid content less than about 20% by weight, the mash produced is normally less mealy and is more cohesive so that the mash does not fall from roll to roll, but is transferred uniformly.

Another and even more important problem is that the mashed potatoes held on the spreader rolls receive considerable heat treatment as they rotate. The temperature of the mash on the rolls is at about the boiling point of water. As the mash is transferred from the first roll toward the last, a progressive undesirable change in flavor and color of the mashed potatoes occurs. In addition, the breakdown of color and flavor components become more apparent in storage as off-flavors and odors develop which make the product less palatable.

This invention eliminates or substantially reduces the problem of the potato mash dropping from one separator roll to the next, and the problem of overheating and scorching with the attendant breakdown in color and flavor.

In terms of method, dehydrated potato flakes are formed by cooking and mashing potatoes, passing the mashed potatoes between a moving drying surface and at least one rotating spreader roll to deposit a layer of mashed potatoes on the drying surface and a layer of mashed potatoes on the spreader roll. The potatoes on the drying surface are heated to drive off water, and the potatoes on the spreader roll are cooled to prevent overheating. Preferably, potato mash on the spreader rolls is cooled to a temperature substantially below the boiling point of water, but above the dew point of the air surrounding the mash on the spreader rolls, to prevent excessive heat treatment and breakdown of color and flavor, and condensation of moisture back into the mash. The cooling of the potato mash on the spreader rolls also makes it stiffer with less tendency to fall from one roll to the next, thus permitting better automatic control of the transfer of the mash and impurities from one roll to the next. Flakes produced by this method have a storage life greater than when the potato mash on the spreader rolls is not cooled.

Preferably, the potato mash on the spreader rolls is cooled by passing a cooling fluid, such as water or air, through the spreader rolls. A stream of drying air is also moved past the mashed potatoes on the spreader rolls to permit the spreader rolls to be cooled to a lower temperature without a recondensation of moisture, which would make the drying less effective.

Apparatus for dehydrating potatoes in accordance with the present invention includes a heatable drying surface for driving water from the potatoes with one or more rotatable spreader rolls spaced from the surface for depositing a layer of cooked potato mash on the drying surface. Means are provided for cooling the spreader roll to reduce the temperature of the mashed potatoes on the spreader roll and to prevent the potatoes from dropping off it.

Figure 2:
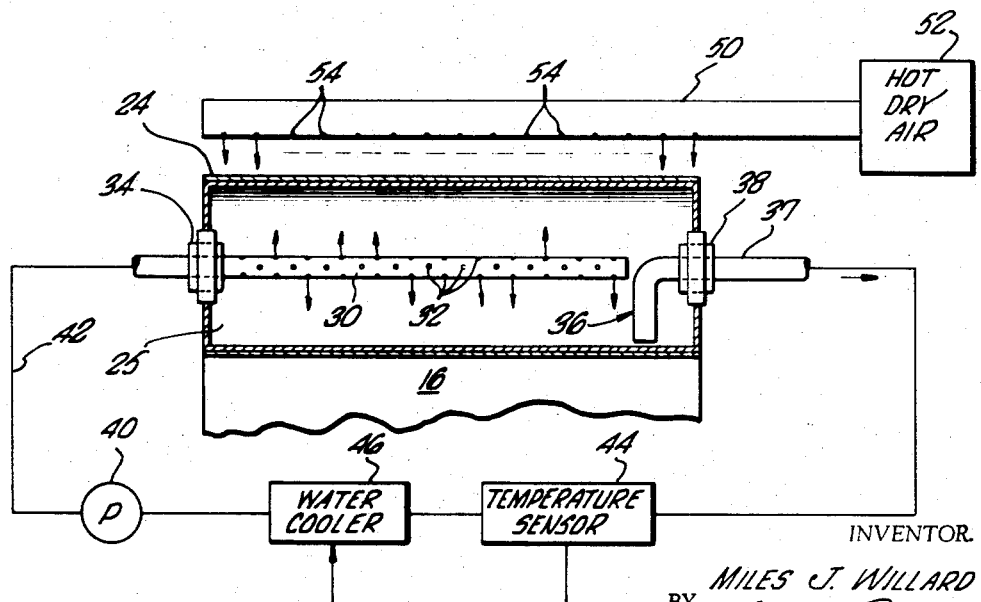

The invention will be more fully understood from the following detailed description and the accompanying drawings, in which:

FIG. 1 is a schematic end elevation of cooked, mashed potatoes being applied between a drier drum and several spreader rolls; and FIG. 2 is a schematic cross sectional view taken along line 2—2 of FIG. 1 showing the interior of the spreader roll and a means for cooling the potato layer on the roll.

Raw potatoes (not shown) to be dehydrated are peeled either by an abrasion process, a steam peeling process, or by a treatment with lye. The potatoes are washed, hand trimmed to remove blemishes and other irregularities, and thereafter sliced into slabs approximately ½ inch thick. Excess starch is washed from the sliced potatoes before the batch is precooked for 20 minutes in water at 160° F. The precooking step gels the starch in the potato cells at a low temperateur before the final cooking step to improve the texture of the reconstituted product and to permit the use of low solids potatoes. The precooked potatoes are cooled to a temperature of 50° F. to 60° F. to retrograde, polymerize, or cross link amylose and reduce the stickiness of the potatoes. The precooked and cooled potatoes are thereafter cooked at 200° F. to 212° F. for a period which varies with the amount of solids in the potatoes. Approximately 20 minutes is required for high solid varieties, whereas 40 minutes is sometimes required for low solid varieties. At any rate, the potatoes are cooked to the point where they are soft enough to be mashed easily with minimum cell rupture. Preferably, the cooked potatoes are mashed by inserting the potatoes in a ricing machine designed to minimize rupture of potato cells and liberation of free starch.

At this point, well known additives, such as emulsifiers, mono and diglycerides, sodium acid pyrophosphate, polyphosphate, sulfur dioxide, antioxidents, and the like are added to the potato mash.

Referring to FIGS. 1 and 2, cooked mashed potatoes 12 are dispensed from an elongated horizontal hopper 14 into a space 15 between an elongated horizontal rotatable drying drum 16 and a first or upper elongated spreader roller 18 mounted adjacent the drying drum to rotate about an axis parallel to that of the drying drum. The drying drum is of conventional construction, and is heated by conventional means, such as the injection of steam (not shown) to a temperature between 250° F. and 330° F.

The cooked mashed potatoes are deposited in a thin film or layer 19 on the exterior surface of the drying drum, and a layer 20 on the exterior surface of the first spreader roll. Mashed potatoes pass between the first spreader roll and the drying drum, and are picked up by a second elongated horizontal spreader roll 22 mounted adjacent and below the first spreader roll to rotate about a horizontal axis parallel to that of the drying drum. A layer 23 of mashed potatoes accumulates around the second spreader roll. Mashed potatoes pass between the second spreader roll and the drying drum and form a layer 24 of mashed potatoes around a third spreader roll 25, which is mounted adjacent the drying drum below the second spreader roll to rotate on a horizontal axis parallel to that of the drying drum. A fourth spreader roll 26 below and parallel to the third spreader roll accumulates a layer 27 of mashed potatoes on its outer surface as mashed potatoes pass between the drying drum and the third spreader roll. The rolls are spaced progressively farther from the drying drum. The first roll is spaced about ⅛ inch from the drum, and the last about ¼ inch from the drum. If the consistency of the mashed potatoes is such that they do not automatically accumulate on the second, third, and fourth spreader rolls to the extent required, conventional scrapers (not shown) are intermittently applied to the rolls to transfer the necessary amount of mash from the upper to the lower rolls.

As shown best in FIG. 2, a separate elongated distributor pipe 30 with discharge openings 32 is coaxially journalled inside each spreader roll by passing through a respective swivel or rotatable packing gland 34 at one end of each roll. Each distributor pipe terminates adjacent the opposite end of each respective roll, and a separate L-shaped pickup pipe 36 has a horizontal leg 37 journalled through a swivel 38 in that end of the supply roll. A vertical leg of the pickup pipe terminates near the lower portion of the roll. A cooling fluid, such as water, is forced by a pump 40 through a supply line 42 into the end of the distributor pipe extending outwardly from packing gland 34. The cooling fluid is discharged through the openings 32 in the discharge pipe against the interior surface of the spreader roll, and collects in the lowermost portion of the roll where it is picked up by pipe 36 and circulated through a temperature sensor 44 and a water cooler 46 back to the pump. The temperature sensor is a conventional type, and it automatically regulates the water cooler to keep the temperature of the water coming from the roll at a desired value.

A separate elongated horizontal air tube 50 is mounted between adjacent spreader rolls and connected to a source 52 of hot dry air. Each air tube has a plurality of longitudinally spaced openings 54 which direct hot dry air past the mashed potatoes on the adjacent spreader roll.

An open trough 56 is mounted under the last, or fourth, spreader roll 26 to catch matter which falls or is cut from the bottom spreader roll.

A conventional elongated horizontal doctor knife 58 scrapes the dried mashed potatoes from the drying drum. The potatoes fall into a product conveyor 60 where they are broken up and carried to a packaging station (not shown).

In operating the apparatus shown in FIGS. 1 and 2, steam is applied to the interior of the drying drum at a temperature between 250° F. and 330° F. Water is passed through the spreader roll to keep the mashed potatoes on them at about 180° F. Hot, dry air is supplied from the air tube at a temperature of about 160° F.

As the drier drum moves under the spreader rolls, each roll deposits a succeeding layer of mashed potatoes onto the drum to build up a commercially thick layer which is dried as it moves around the drum and removed by the doctor knife.

The layers of mashed potatoes on each of the spreader rolls are kept relatively cool by the cooling water passing through the rolls. This prevents prolonged exposure of the mashed potatoes on the rolls to relatively high temperatures and reduces the browning and oxidation of the potatoes, thereby improving the appearance and flavor of the product.

The rate of browning of potatoes increases rapidly with increasing temperature, about 3- to 6.5-fold with each 10° C. (18° F.) rise for constant moisture browning between 40° C. (104° F.) and 100° C. (212° F.)

The cooling of the layers of mashed potatoes on the spreader rolls also makes them more cohesive, and facilitates the uniform and orderly transfer of mashed potatoes from one roll to the next. The better coherence of the layers of mashed potatoes on the spreader rolls reduces the tendency of the potatoes to fall from one roll to the next and eliminates the need of an operator with a shovel to transfer mashed potatoes from the lower rolls back toward the upper rolls.

The hot, dry air from the air tube carries away moisture evaporated from the mashed potatoes and prevents it from condensing on the cooler mashed potatoes on the spreader rolls.

Defective material, such as particles of skin, rot, and corky tissue, etc., are progressively concentrated and transferred from the first roll toward the last, from which it is periodically removed.

While the present invention has been directed to a specific process best adapted for dehydrating potato mash into flakes, other products such as pumpkin, sweet potatoes, tomatoes, and the like, which may be cooked and mashed into a consistency similar to that of a potato mash could be dehydrated in a similar manner. The present invention, including the process and apparatus, may be applied to the dehydration of most vegetables and fruit purees, and is not limited to the dehydration of potato mash.

I claim:

1. A process for dehydrating potatoes, comprising the steps of cooking raw potatoes, mashing the cooked potatoes, passing the cooked mashed potatoes between a moving drying surface and a rotating spreader roll to deposit a layer of potatoes on the drying surface and a layer on the spreader roll, heating the drying surface to drive water from the potatoes, and cooling the potatoes on the spreader roll to prevent overheating of the potatoes on the spreader roll.

2. A process for dehydrating potatoes, comprising the steps of cooking raw potatoes, mashing the cooked potatoes, passing the cooked mashed potatoes between a rotating drying drum and a rotating spreader roll to deposit a layer of potatoes on the drying surface and a layer on the spreader roll, heating the drying drum to drive water from the potatoes, and cooling the potatoes on the spreader roll to a temperature below that of the potatoes on the drying drum.

3. A process for dehydrating potatoes, comprising the steps of cooking raw potatoes, mashing the cooked potatoes, passing the cooked mashed potatoes between a rotating drying drum and a rotating spreader roll to deposit a layer of potatoes on the drying surface and a layer on the spreader roll, heating the potatoes on the drying drum to drive water from the potatoes, and cooling the spreader roll to prevent overheating of the potatoes on it.

4. A process for dehydrating potatoes, comprising the steps of cooking raw potatoes, mashing the cooked potatoes, passing the cooked mashed potatoes between a rotating drying drum and a rotating spreader roll to deposit a layer of potatoes on the drying surface and a layer on the spreader roll, heating the drying drum to drive water from the potatoes, and cooling the potatoes on the spreader roll to a temperature above about 180° F. to prevent overheating of the potatoes on the spreader roll.

5. A process for dehydrating potatoes, comprising the steps of cooking raw potatoes, mashing the cooked potatoes, passing the cooked mashed potatoes between a rotating drying drum and a rotating spreader roll to deposit a layer of potatoes on the drying surface and a layer on the spreader roll, heating the drying drum to drive water from the potatoes, removing water vapor from the vicinity of the potatoes on the spreader roll to prevent condensing moisture on the potatoes and to enhance the evaporation of water from the potatoes on the drum, and cooling the potatoes on the spreader roll to prevent overheating of the potatoes on the spreader roll.

6. A process for dehydrating potatoes, comprising the steps of cooking raw potatoes, mashing the cooked potatoes, passing the cooked mashed potatoes between a rotating drying drum and a rotating spreader roll to deposit a layer of potatoes on the drying surface and a layer on the spreader roll, heating the drying drum to drive water from the potatoes, blowing the water vapor from the vicinity of the potatoes on the spreader roll to prevent moisture from condensing on the potatoes and to enhance the evaporation of water from the potatoes on the drum, and cooling the potatoes on the spreader roll to prevent overheating of the potatoes on it.

7. A process for dehydrating potatoes, comprising the steps of cooking raw potatoes, mashing the cooked potatoes, passing the cooked mashed potatoes between a moving surface and a rotating spreader roll to deposit a layer of potatoes on the drying surface and a layer on the spreader roll, heating the potatoes on the moving surface to drive water from the potatoes, cooling the potatoes on the sperader roll to a temperature above the dew point of the air between the surface and the spreader roll to prevent overheating of the potatoes on the spreader roll, and blowing air between the spreading roll and the drying surface to lower the dew point of the air adjacent the spreader roll.

8. A process for dehydrating potatoes, comprising the steps of cooking raw potatoes, mashing the cooked potatoes, passing the cooked mashed potatoes between a moving surface and a rotating spreader roll to deposit a layer of potatoes on the drying surface and a layer on the spreader roll, heating the potatoes on the moving surface to drive water from the potatoes, and cooling the potatoes on the spreader roll to a temperature above the dew point of the air between the surface and the spreader roll to prevent overheating of the potatoes on the spreader roll.

9. A process for dehydrating potatoes, comprising the steps of cooking raw potatoes, mashing the potatoes, passing the cooked mashed potatoes between a rotating drying drum and a rotating spreader roll to deposit a layer of potatoes on the drying surface and a layer on the spreader roll, heating the drying drum to drive water from the potatoes, blowing air heated to a temperature above room temperature past the potatoes on the surface and spreader roll to prevent moisture from condensing on the potatoes and enhance the evaporation of water from the potatoes, and circulating a cooling fluid through the spreader roll to cool it and prevent overheating of the potatoes on it.

10. A process for dehydrating potatoes, comprising the steps of cooking raw potatoes, mashing the cooked potatoes, passing the cooked mashed potatoes between a moving drying surface and a hollow rotating spreader roll to deposit a layer of potatoes on the drying surface and a layer on the spreader roll, heating the drying surface to drive water from the potatoes, and circulating a cooling fluid through the spreader roll to cool the potatoes on the spreader roll to prevent overheating of the potatoes on it.

11. Apparatus for dehydrating cooked mashed potatoes comprising a heatable drying surface for driving water from the potatoes, a rotatable spreader roll spaced from the drying surface for depositing a layer of the cooked mashed potatoes on the drying surface and adapted to carry a layer of potatoes to apply succeeding layers of potatoes to the drying surface, and means for cooling the spreader roll to a temperature above the dew point to prevent overheating of the potatoes on the drying surface and to prevent the potatoes from dropping off the spreader roll without condensing moisture on the potatoes on the spreader roll.

12. Apparatus for dehydrating cooked mashed potatoes comprising a rotatable heatable drying drum for driving water from the potatoes, a rotatable hollow spreader roll spaced from the drying drum for depositing a layer of the cooked mashed potatoes on the drum and adapted to carry a layer of potatoes to apply succeeding layers of potatoes on the drum, and means for introducing a cooling fluid into the interior of the spreader roll for cooling the potatoes on the roll.

13. Apparatus for dehydrating cooked mashed potatoes comprising a rotatable heatable drying drum for driving water from potatoes, a rotatable hollow spreader roll spaced from the drum for depositing a layer of the cooked mashed potatoes on the drum and adapted to carry a layer of potatoes to apply suceeding layers of potatoes on the drum, a fluid inlet and outlet coupled with the hollow spreader roll used to duct cooling water into the spreader roll to cool the potatoes, and means for introducing cooling water into the spreader roll inlet with the water at a temperature to cool the potatoes on the roll to a temperature above the dew point to prevent overheating of the potatoes and to prevent the potatoes from dropping off the spreader roll without condensing moisture on the potatoes on the spreader roll.

14. Apparatus for dehydrating cooked mashed potatoes comprising a heatable rotatable drying drum for driving water from potatoes, a plurality of rotatable hollow spreader rolls spaced from the drying drum for depositing a layer of the cooked mashed potatoes on the drum and adapted to carry a layer of potatoes to apply succeeding layers of potatoes on the drum, means for reducing the relative humidity of the air around each spreader roll to accelerate evaporation of the water in the potatoes and prevent condensation of moisture on the potatoes on the rolls, and means for cooling the potatoes on the spreader rolls to a temperature between 180° F. and the temperature of the potatoes on the drying drum.

15. Apparatus for dehydrating cooked mashed potatoes comprising a heatable rotatable drying drum for driving water from potatoes, a plurality of rotatable hollow spreader rolls spaced from the drying drum for depositing a layer of the cooked mashed potatoes on the drum and adapted to carry a layer of potatoes to apply succeeding layers of potatoes on the drum, a plurality of hollow manifolds for directing heated air between adjacent spreader rolls to prevent condensation of moisture on the potatoes on the rolls, and means for circulating a cooling fluid through the spreader rolls.

References Cited

UNITED STATES PATENTS

| | | | |
|---|---|---|---|
| 3,163,546 | 12/1964 | Pader | 99—209 |
| 3,273,458 | 9/1966 | Willard | 99—207 |

OTHER REFERENCES

Von Loesecke, H. W., Drying and Dehydration of Foods, Reinhold Publishing Corp., New York, 1955, second ed. (pp. 5–7).

Cording, Jr. et al., Advances in the Dehydration of Mashed Potatoes by the Flake Process, 1957, Food Technology, vol. XI, No. 4 (pp. 1–3).

LIONEL M. SHAPIRO, *Primary Examiner.*

D. M. NAFF, *Assistant Examiner.*

U.S. Cl. X.R.

99—246; 34—117; 159—11